Figures 1, 2:
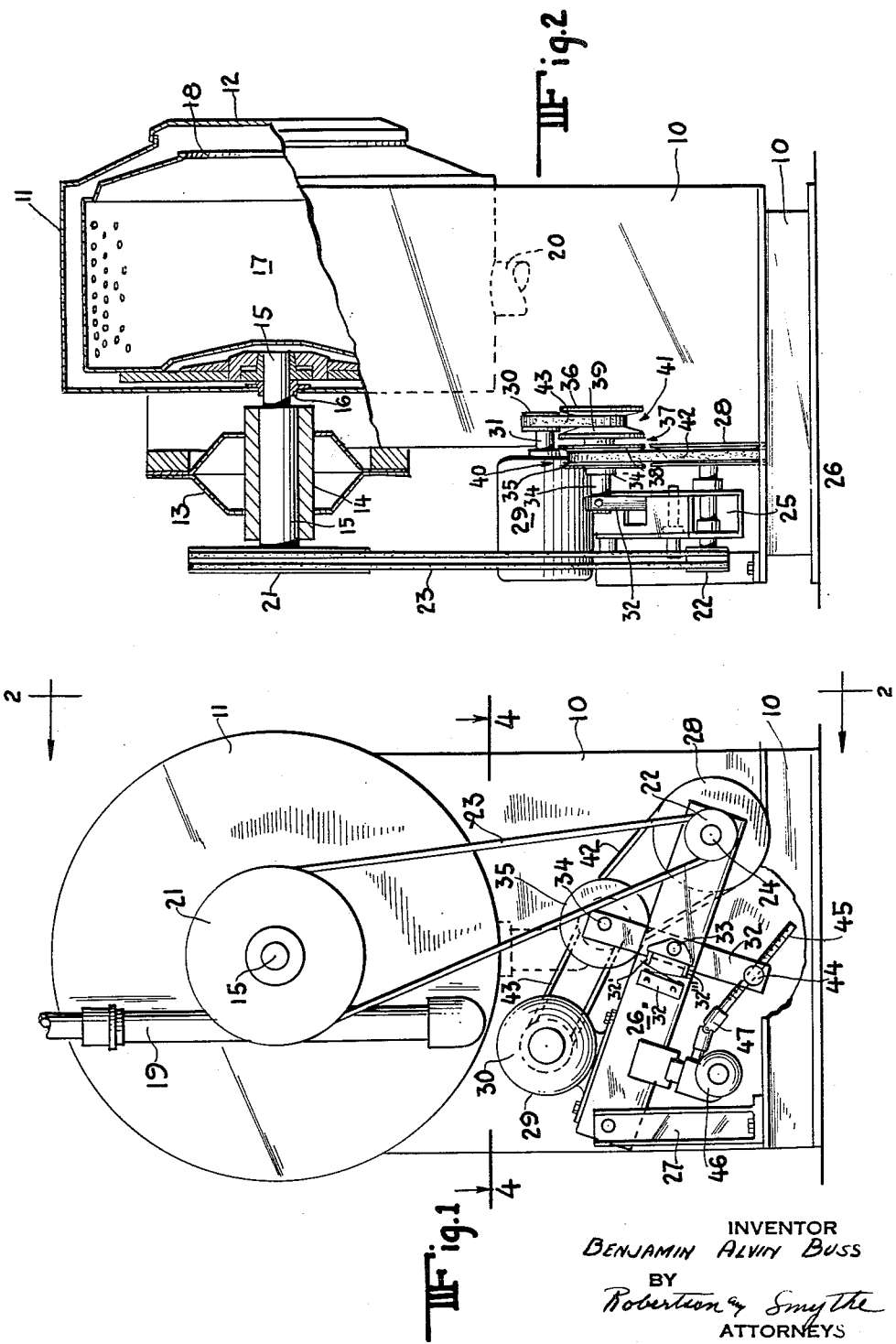

INVENTOR
BENJAMIN ALVIN BUSS
BY
Robertson & Smythe
ATTORNEYS

Dec. 18, 1962     B. A. BUSS     3,068,677
LAUNDRY MACHINE HAVING A VARIABLE SPEED BELT
DRIVE WITH MEANS FOR VARYING BELT TENSION
Filed June 27, 1960     2 Sheets-Sheet 2
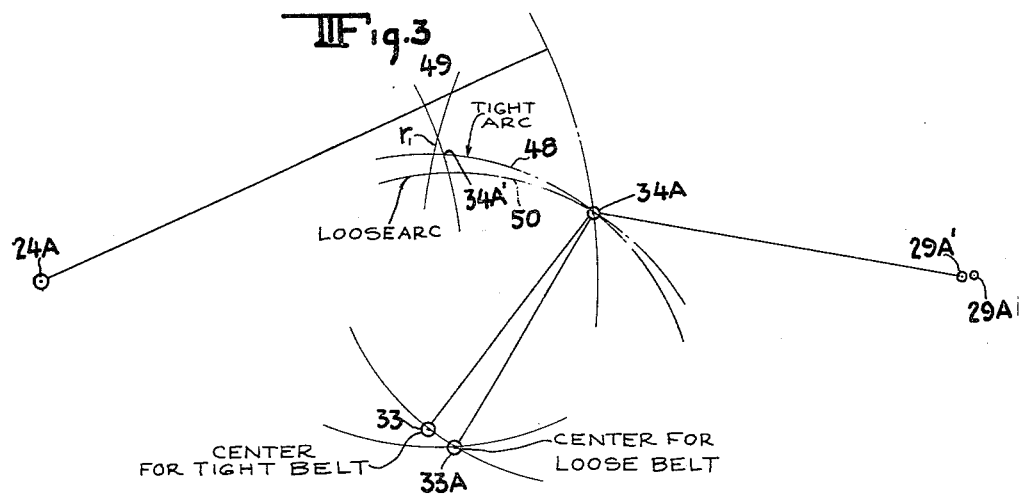
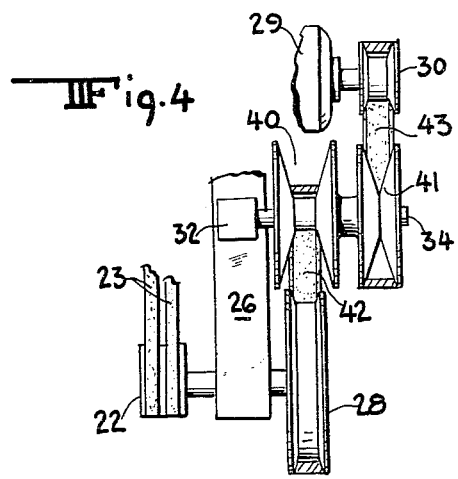
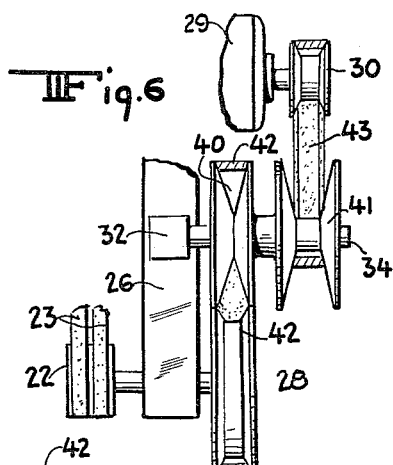
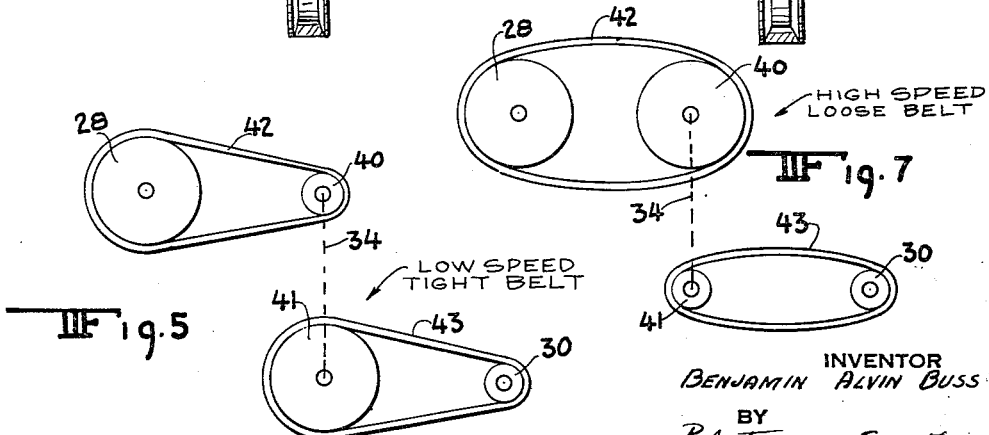
INVENTOR
BENJAMIN ALVIN BUSS
BY
Robertson and Smythe
ATTORNEYS United States Patent Office 3,068,677
Patented Dec. 18, 1962

3,068,677
LAUNDRY MACHINE HAVING A VARIABLE SPEED BELT DRIVE WITH MEANS FOR VARYING BELT TENSION
Benjamin Alvin Buss, East Moline, Ill., assignor to Ametek Inc., a corporation of Delaware
Filed June 27, 1960, Ser. No. 39,102
15 Claims. (Cl. 68—140)

The present invention relates to variable speed belt drives of the type which may be employed to rotate the clothes container of a laundry machine, and particularly to a new and improved variable speed belt drive in which belt tightness varies inversely as the speed of rotation of the clothes container varies.

In laundry machines, and particularly those involving heavy drives, serious problems arise due to the generation of heat within the belts at high speeds. This excessive heat causes breakdown of the belt structure, excessive stretching of the belts, and lubrication problems.

An important object of this invention is to provide a variable speed belt drive that will rotate a clothes container of a laundry machine or the like throughout a desired range of speeds without developing excessive temperatures within the belts per se.

Another object of the invention is to provide such a variable speed belt drive in which the belt tension varies inversely as the speed of rotation of the clothes container varies.

Still another object of the invention is to provide such a variable speed belt drive for a laundry machine in which less power is required at high speeds than would normally be required with tight belts.

In one aspect of the invention, a clothes container of a laundry machine may be mounted within a frame for rotation about a horizontal axis. This container may be of usual form having a door aligned with the axis of rotation of the container and the usual water inlet and drains that are common to such laundry machines. A variable speed belt drive may be provided for rotating the clothes container, and it may be mounted on a base that is rigidly attached to the main frame. There may be an electric motor mounted at one end of the base having a fixed diameter V-groove pulley on its output shaft. There also may be a fixed diameter V-groove pulley system at the opposite end of the base. Between the two ends of the base may be located a pivotally mounted arm supporting an expansible V-groove pulley system that is belted to the motor pulley and to the pulley system at the other end of the base. The expansible pulley system may include two opposed conical flanges fixed in spaced relation to a sleeve journaled on a shaft. Between the two flanges may be a conical surfaced element fastened to the sleeve so that it may move toward and away from the opposed fixed conical flanges. The conical surfaces of the element form V-grooves with the respective fixed conical flanges.

In another aspect of the invention, the pivotal mounting for the expansible pulley system may include a pivotally mounted nut that is threaded onto a rotatable screw that is selectively driven by an electric motor also mounted on the base for the variable speed drive.

In still another aspect of the invention, the location of the pivot point for the expansible system may be chosen so that the belt tightness varies inversely as the speed of rotation of the clothes container varies. It has been found that at the slow speed end of the cycle of rotations of the clothes container and during the initial increase in speed before the water has been drained from the container, maximum torque is required, and for efficient operation maximum tension is required in the belts of the variable speed system. However, as the speed of the container increases, the torque requirements diminish even though the speed is increasing. This is due to the reduction in required torque due to the elimination of the water within the container.

It has also been found that if the belt tension required at low speeds to transmit the necessary power is retained at the high speed end of the cycle, an excessive temperature rise occurs within the belts, thereby deteriorating them and materially reducing their operating life. This constant belt tension throughout the range of variable speeds is caused by moving the axis of the expansible pulley system along an arc such that each point therealong represents a separate driven speed and wherein the belt tension remains constant regardless of the position of the expansible pulley axis along said arc.

In still another aspect of the invention, the pivot for the expansible pulley system may be moved about an arc, the center of which lies on the above referred to arc at the low speed end thereof, in a direction and an amount sufficient to cause a predetermined slackening of the belts of the variable speed system at the high speed end of the cycle of operation. While the movement of the pivot point as above described is the preferred way of varying the belt tension inversely as the speed of the container varies, it must be recognized that the same results can be obtained by slidingly mounting the motor on the one end of the base and connecting it by a linkage to the pivotally mounted expansible pulley system so that as the latter pivots to increase the speed of the container, the motor moves in a direction and an amount to slacken the belts a predetermined amount, and vice versa.

The above, other objects and novel features of the invention will become apparent from the following specification and accompanying drawings which are merely exemplary.

In the drawings:
FIG. 1 is a back elevational view of a laundry machine to which the principles of the invention have been applied;
FIG. 2 is an end view of the machine of FIG. 1, as viewed along line 2—2 of FIG. 1;
FIG. 3 is a diagram of a method of determining the location of a pivot point for the expansible pulley system of this invention;
FIG. 4 is a view looking along line 4—4 of FIG. 1, with the container being rotated at its slow rate of speed;
FIG. 5 is a schematic showing of the belts of FIG. 4 in their high tension condition;
FIG. 6 is a view similar to FIG. 4, with the container being rotated at a high speed; and
FIG. 7 is a view showing the belts in their loosened condition but still driving the container.

Referring to the drawings, and particularly to FIGS. 1 and 2, the principles of the invention are shown as applied to a laundry machine including a frame 10 having a cylindrical housing 11. The housing 11 may be provided with the usual pivotally mounted door 12. The frame 10 may include a bracket 13 that supports a bearing 14 in axial alignment with the cylindrical housing 11.

A shaft 15 may be journaled in bearing 14 and its one end may extend through seals 16 formed in the wall of housing 11 opposite that containing the door 12. A cylindrical clothes container 17 may be attached to shaft 15 within housing 11, and it may include an open mouth portion 18 axially aligned with and adjacent to the door 12. The usual inlet 19 and drain 20 may be provided for the machine.

The shaft 15 may have a constant diameter V-groove pulley 21 fixed to its end opposite that supporting container 17. Pulley 21 is connected to a constant diameter V-groove pulley 22 through V-belts or variable speed belts 23. The pulley 22 is fixed to a shaft 24 that is journaled in a bearing 25 mounted at one end of a base 26 that is supported by the frame 10. The one end of base 26 may be fixed to bracket means 27 so that it is angularly disposed with respect to the bottom of the frame 10.

The end of shaft 24 opposite that to which V-groove pulley 22 is fixed may fixedly support another V-groove pulley 28 of constant diameter. An electric motor 29 may be fixed to the end of base 26 opposite that supporting bearing 25, and it may have a fixed diameter V-groove pulley 30 keyed to its output shaft 31. Intermediate the motor 29 and the bearing 25 on base 26, there may be mounted an arm 32 on a pivot 33. The upper end of arm 32 may fixedly support a shaft 34.

Referring to FIG. 2, shaft 34 may have journaled on it a sleeve 34' to which is fixed opposed conical disks 35 and 36. Between disks 35 and 36, there may be a member 37 mounted on sleeve 34' for movement toward and from disks 35 and 36. The member 37 may be provided with conical surfaces 38 and 39 which, respectively, form with disks 35 and 36 expansible V-groove pulleys 40 and 41. V-belting 42 may connect pulley 40 with constant diameter pulley 28; and, V-belting 43 may connect pulley 41 with constant diameter pulley 30.

The lower end of arm 32 may pivotally support a threaded nut 44 that threadingly receives a rotatable screw 45. The screw 45 may be connected to the output shaft of a reversible electric motor 46 through a universal joint 47. The motor 46 may be mounted on the base 26. By energizing the motor 46, the arm 32 can be made to pivot about the point 33 to cause the expansible pulley system including pulleys 40 and 41 to move toward and from either of the fixed diameter pulleys 28 and 30.

There are an infinite number of positions in space at which the axis of shaft 34 may be positioned between pulleys 30 and 28, at each of which the latter is driven at a different speed. It has been usual practice to determine the locus of these positions that will provide substantially constant tension in the belts 42 and 43. The locus of these positions defines an arcuate curve, and the pivot 33 was located so that the axis of shaft 34 followed this arcuate path, hence maintaining the tension in belts 42 and 43 substantially constant.

This arrangement is quite satisfactory when the container 17 is being rotated at low speeds where the water and clothing provide a high torque to be overcome. However, at the high speed end of the range of speeds of container 17, most of the water has been removed from the container 17 and the torque requirements have materially been reduced. Consequently, in spite of the increased speed, the horsepower requirements fall off substantially. With the tension in belts 42 and 43 the same at high speed as at low speed, excessive heat is generated in the belts, and particularly in belt 43 since it is required to travel about expansible pulley 41 at a minimum radius, thereby causing maximum flexing of the belt as it moves at high speed. It has been found that this difficulty can be overcome by varying the tightness of the belts 42 and 43 inversely as the speed of the container 17 varies. One way of doing this is to mount the motor 29 on the base 26 for sliding action therealong and to connect it through suitable linkage to the arm 32, so that as the arm 32 moves in a counterclockwise direction (FIG. 1), it increases the speed of rotation of pulley 28 and at the same time moves motor 29 toward pulley 28. This latter action, of course, loosens belts 42 and 43, thereby accomplishing the desired results. This arrangement has certain drawbacks, and it is preferable to fixedly mount motor 29 on base 26.

The preferred manner of accomplishing the desired results is to cause the axis 34A of shaft 34 to move along an arcuate path that will have its low speed end coincident with the previously referred to arcuate path for constant belt tension, and to have the high speed end of this new arcuate path deviate from the high speed end of the constant tension arcuate path. To do this, the location of the pivot 33 must be different from that providing constant tension in belts 42 and 43 throughout the speed range.

Referring to FIG. 3, one method of correctly locating the pivot point 33 is to establish the proper location of pivot point 33 so that constant tension in belts 42 and 43 exists throughout the desired speed range. This location of pivot 33 will cause the axis 34A of shaft 34 to follow along an arcuate path 48. With the unit arranged to rotate container 17 at its maximum desired speed, the axis 29A of motor 29 may be moved toward pulley 28 to a point 29A' to provide the desired looseness of belts 42 and 43 at the high speed end of the range. This displacement is noted, and the motor 29 is returned to its initial position. An arc is struck from the point 29A' having a radius equal to the distance from point 29A to the point 34A' on arc 48 representing the position of axis 34A of shaft 34 along arc 48 for the high speed value of container 17. Another arc is struck from the axis 24A of shaft 24 having a radius equal to the distance from point 24A to the point 34A' on arc 48 representing the position of 34A for maximum speed of container 17. The intersection of these two arcs is at a point 49 spaced a distance $r_1$ from the arc 48.

Another arc, having a radius equal to the distance from 34 to 33 (FIG. 1), is struck through the point 33 (FIG. 3) from a center 34A on arc 48 representing the position of axis 34A of shaft 34 for the low speed of container 17. Another arc is struck from the point 34A' on arc 48 and having a radius equal to the distance between points 33 and 34A plus the value of $r_1$. The intersection 33A of these last two arcs is the location for the pivot 33 to provide the desired results. With point 33A as a center and a radius equal to the distance between 33 and 34A, an arc 50 may be drawn. This arc 50 represents the locus of the points of the axis 34A of shaft 34 in moving from the point 34A on arc 50 where the speed of container 17 is at a minimum (FIGS. 4 and 5) to a point on arc 50 where the speed of container 17 is a maximum (FIGS. 6 and 7). Under these conditions, the belts 42 and 43 will be tight when the container 17 is rotating at low speed (FIG. 5), and loose when the container 17 is rotating at high speed (FIG. 7).

With the apparatus in the condition shown in FIGS. 4 and 5, the container 17 will rotate at a slow rate of speed, and the belts 42 and 43 will be in a tight condition as shown. This tight condition of belts 42 and 43 is essential to meet the high torque demands with the container loaded with water and clothes. Energizing the motor 46 to rotate in the proper direction will cause the arm 32 to turn in a counterclockwise direction to the position shown in FIGS. 1 and 2, whereupon an actuator 32' of a switch means 32'' will break the circuit of the motor 46. This counterclockwise movement of arm 32 will increase the speed of container 17 to its extracting speed and the belts 42 and 43 will assume the loose condition shown in FIGS. 6 and 7. In this high speed condition, the belts 42 and 43 will not be flexed as severely as they would be if they were tight. This action of the belts 42 and 43 traveling about pulleys 28, 40, 41 and 30 at radii greater than they would if the belts were tight reduces the temperature generated internally of the belts, and consequently the apparatus consumes less power at high speed than it would if the belts were tight. This also results in an appreciable increase in the life of the belts 42, 43, reduces the load on the pulley bearings, and overcomes lubrication problems.

After a predetermined time, the motor 46 may be energized in a manner to cause it to rotate reversely, thereby rotating arm 32 in a clockwise direction until an actuator 32''' of switch means 32'' breaks the circuit to motor 46. This clockwise movement of arm 32 will decrease the speed of container 17 to its low speed where the clothes can be subjected to a heating action if a drying operation is contemplated in the cycle of operations, and conditions the apparatus for a new cycle of operations.

Although the various features of the new and improved variable speed system have been shown and described in detail to fully disclose one embodiment of the invention, it will be evident that changes may be made in such details and certain features may be used without others without departing from the principles of the invention.

What is claimed is:

1. In a variable speed belt drive, a base; a motor mounted on said base and having a constant diameter V-groove pulley means on its output shaft; a driven, constant diameter V-groove pulley means mounted on said base; expansible pulley means journaled on an arm pivoted to said base intermediate said motor and driven pulley means; V-belts connecting said motor pulley means and said driven pulley means to said expansible pulley means; means for oscillating said arm to vary the rate of rotation of said driven pulley means; and means for causing said connecting belts to be tight when said driven pulley means is rotating at a relatively slow speed and for causing said belt means to become loosened a predetermined amount when said driven pulley means is rotating at a relatively rapid rate of speed.

2. In a variable speed belt drive, a base; a motor mounted on said base and having a constant diameter V-groove pulley means on its output shaft; a driven, constant diameter V-groove pulley means mounted on said base; expansible pulley means journaled on an arm pivoted to said base intermediate said motor and driven pulley means; V-belts connecting said motor pulley means and said driven pulley means to said expansible pulley means; means for oscillating said arm to vary the rate of rotation of said driven pulley means; and means for causing the tightness of said connecting belts to vary inversely as the speed of said driven pulley means varies.

3. In a variable speed belt drive, a base; a motor mounted on said base and having a constant diameter V-groove pulley means on its output shaft; a driven, constant diameter V-groove pulley means mounted on said base; an arm mounted on said base intermediate said motor and driven pulley means; a sleeve journaled on a shaft at one end of said arm; opposed conical flanges axially fixed to said sleeve; a member splined to said sleeve and located between said flanges, said member having conical surfaces which form V-grooves with said flanges; V-belts connecting one of said V-grooves with said motor pulley; another V-belt connecting the other V-groove with said driven pulley; a pivot for said arm; and means connected to said arm for oscillating it about its pivot to cause said driven pulley to be rotated at different rates, said pivot being located in a position such that said belts are tight when said arm is in the vicinity of one of its limits of oscillatory movement, and loose when said arm is in the vicinity of the other limit of its oscillatory movement.

4. In a variable speed belt drive, a base; a motor mounted on said base and having a constant diameter V-groove pulley means on its output shaft; a driven, constant diameter V-groove pulley means mounted on said base; expansible pulley means journaled on an arm pivoted to said base intermediate said motor and driven pulley means; V-belts connecting said motor pulley means and said driven pulley means to said expansible pulley means; a reversible electric motor for oscillating said arm to vary the rate of rotation of said driven pulley means; and means for causing said connecting belts to be tight when said driven pulley means is rotating at a relatively slow speed and for causing said belt means to become loosened a predetermined amount when said driven pulley means is rotating at a relatively rapid rate of speed.

5. In a variable speed belt drive, a base; a motor mounted on said base and having a constant diameter V-groove pulley means on its output shaft; a driven, constant diameter V-groove pulley means mounted on said base; expansible pulley means journaled on an arm pivoted to said base intermediate said motor and driven pulley means; V-belts connecting said motor pulley means and said driven pulley means to said expansible pulley means; means for oscillating said arm to vary the rate of rotation of said driven pulley means; means for causing said connecting belts to be tight when said driven pulley means is rotating at a relatively slow speed and for causing said belt means to become loosened a predetermined amount when said driven pulley means is rotating at a relatively rapid rate of speed; and means for determining the extent of oscillatory movement of said expansible pulley means.

6. In a variable speed belt drive, a base; a motor mounted on said base and having a constant diameter V-groove pulley means on its output shaft; a driven, constant diameter V-groove pulley means mounted on said base; expansible pulley means journaled on an arm pivoted to said base intermediate said motor and driven pulley means; V-belts connecting said motor pulley means and said driven pulley means to said expansible pulley means; means for oscillating said arm to vary the rate of rotation of said driven pulley means; means for causing the tightness of said connecting belts to vary inversely as the speed of said driven pulley means varies; and means for determining the extent of oscillatory movement of said expansible pulley means.

7. In a variable speed belt drive, a base; a motor mounted on said base and having a constant diameter V-groove pulley means on its output shaft; a driven, constant diameter V-groove pulley means mounted on said base; an arm mounted on said base intermediate said motor and driven pulley means; a sleeve journaled on a shaft at one end of said arm; opposed conical flanges axially fixed to said sleeve; a member splined to said sleeve and located between said flanges, said member having conical surfaces which form V-grooves with said flanges; V-belts connecting one of said V-grooves with said motor pulley another V-belt connecting the other V-groove with said driven pulley; a pivot for said arm; means connected to said arm for oscillating it about its pivot to cause said driven pulley to be rotated at different rates, said pivot being located in a position such that said belts are tight when said arm is in the vicinity of one of its limits of oscillatory movement, and loose when said arm is in the vicinity of the other limit of its oscillatory movement; and means for determining the extent of oscillatory movement of said expansible pulley means.

8. In a variable speed belt drive, a base; a motor mounted on said base and having a constant diameter V-groove pulley means on its output shaft; a driven, constant diameter V-groove pulley means mounted on said base; expansible pulley means journaled on an arm pivoted to said base intermediate said motor and driven pulley means; V-belts connecting said motor pulley means and said driven pulley means to said expansible pulley means; a reversible electric motor for oscillating said arm to vary the rate of rotation of said driven pulley means; means for causing said connecting belts to be tight when said driven pulley means is rotating at a relatively slow speed and for causing said belt means to become loosened a predetermined amount when said driven pulley means is rotating at a relatively rapid rate of speed; and limit switch means for determining the extent of oscillatory movement of said expansible pulley means.

9. In a laundry machine, a frame; a non-rotatable housing mounted in said frame; a shaft mounted in said frame for rotation; a clothes container mounted within said housing and connected to said shaft; a fixed diameter pulley connected to said shaft; water inlet and outlet means connected to said housing; a base mounted in said frame; fixed diameter pulley means mounted on said base; a belt drive between the fixed diameter pulleys on said base and shaft; a motor mounted on said base; a fixed diameter pulley keyed to the output shaft of said motor; expansible pulley means oscillatably mounted on said base intermediate the motor pulley and the fixed diameter pulley means on said base; belts connecting said expansible pulley means and the fixed diameter pulley means on said base; and a pivot on said base for said expansible pulley means, said pivot being located such that in one oscillatable position of said expansible pulley means said belts thereon are tight, and in another oscillatable position said belts have a predetermined looseness.

10. In a laundry machine, a frame; a non-rotatable housing mounted in said frame; a shaft mounted in said frame for rotation; a clothes container mounted within said housing and connected to said shaft; a fixed diameter pulley connected to said shaft; water inlet and outlet means connected to said housing; a base mounted in said frame; fixed diameter pulley means mounted on said base; a belt drive between the fixed diameter pulleys on said base and shaft; a motor mounted on said base; a fixed diameter pulley keyed to the output shaft of said motor; expansible pulley means oscillatably mounted on said base intermediate the motor pulley and the fixed diameter pulley means on said base; belts connecting said expansible pulley means and the fixed diameter pulley means on said base; and means for causing the belts connected to said expansible pulley means to be tight when said expansible pulley means is at one limit of its oscillatory movement, and to have a predetermined looseness when said expansible pulley means is at the other limit of its oscillatory movement.

11. In a laundry machine, a frame; a non-rotatable housing mounted in said frame; a shaft mounted in said frame for rotation; a clothes container mounted within said housing and connected to said shaft; a fixed diameter pulley connected to said shaft; water inlet and outlet means connected to said housing; a base mounted in said frame; fixed diameter pulley means mounted on said base; a belt drive between the fixed diameter pulleys on said base and shaft; a motor mounted on said base; a fixed diameter pulley keyed to the output shaft of said motor; expansible pulley means oscillatably mounted on said base intermediate the motor pulley and the fixed diameter pulley means on said base; belts connecting said expansible pulley means and the fixed diameter pulley means on said base; a pivot on said base for said expansible pulley means, said pivot being located such that in one oscillatable position of said expansible pulley means said belts thereon are tight, and in another oscillatable position said belts have a predetermined looseness; and means for limiting the oscillatory movement of said expansible pulley means.

12. In a laundry machine, a frame; a non-rotatable housing mounted in said frame; a shaft mounted in said frame for rotation; a clothes container mounted within said housing and connected to said shaft; a fixed diameter pulley connected to said shaft; water inlet and outlet means connected to said housing; a base mounted in said frame; fixed diameter pulley means mounted on said base; a belt drive between the fixed diameter pulleys on said base and shaft; a motor mounted on said base; a fixed diameter pulley keyed to the output shaft of said motor; expansible pulley means oscillatably mounted on said base intermediate the motor pulley and the fixed diameter pulley means on said base; belts connecting said expansible pulley means and the fixed diameter pulley means on said base; a reversible electric motor connected to said expansible pulley means for oscillating the same; and a pivot on said base for said expansible pulley means, said pivot being located such that in one oscillatable position of said expansible pulley means said belts thereon are tight, and in another oscillatable position said belts have a predetermined looseness.

13. In a laundry machine, a frame; a non-rotatable housing mounted in said frame; a shaft mounted in said frame for rotation; a clothes container mounted within said housing and connected to said shaft; a fixed diameter pulley connected to said shaft; water inlet and outlet means connected to said housing; a base mounted in said frame; fixed diameter pulley means mounted on said base; a belt drive between the fixed diameter pulleys on said base and shaft; a motor mounted on said base; a fixed diameter pulley keyed to the output shaft of said motor; expansible pulley means oscillatably mounted on said base intermediate the motor pulley and the fixed diameter pulley means on said base; belts connecting said expansible pulley means and the fixed diameter pulley means on said base; a reversible electric motor connected to said expansible pulley means for oscillating the same; a pivot on said base for said expansible pulley means, said pivot being located such that in one oscillatable position of said expansible pulley means said belts thereon are tight, and in another oscillatable position said belts have a predetermined looseness; and electric switch means connected to said motor for limiting the oscillatory movement of said expansible pulley means.

14. In a laundry machine, a frame; a non-rotatable housing mounted in said frame; a shaft mounted in said frame for rotation; a clothes container mounted within said housing and connected to said shaft; a fixed diameter pulley connected to said shaft; water inlet and outlet means connected to said housing; a base mounted in said frame; fixed diameter pulley means mounted on said base; a belt drive between the fixed diameter pulleys on said base and shaft; a motor mounted on said base; a fixed diameter pulley keyed to the output shaft of said motor; expansible pulley means oscillatably mounted on said base intermediate the motor pulley and the fixed diameter pulley means on said base; belts connecting said expansible pulley means and the fixed diameter pulley means on said base; and a pivot on said base for said expansible pulley means, said pivot being located such that the arc of movement of said expansible pulley means is coincident with at least one point of, and deviates at other points from, an arc of movement which maintains the belts connected to said expansible pulley means tight throughout the range of such oscillatory movement.

15. In a laundry machine, a frame; a non-rotatable housing mounted in said frame; a shaft mounted in said frame for rotation; a clothes container mounted within said housing and connected to said shaft; a fixed diameter pulley connected to said shaft; water inlet and outlet means connected to said housing; a base mounted in said frame; fixed diameter pulley means mounted on said base; a belt drive between the fixed diameter pulleys on said base and shaft; a motor mounted on said base; a fixed diameter pulley keyed to the output shaft of said motor; expansible pulley means oscillatably mounted on said base intermediate the motor pulley and the fixed diameter pulley means on said base; belts connecting said expansible pulley means and the fixed diameter pulley means on said base; and a pivot on said base for said expansible pulley means, said pivot being located such that the arc of movement of said expansible pulley means intersects an arc of movement, which would maintain the expansible pulley belts tight throughout the range of adjustment, at a point where the fixed diameter pulley means on said base is rotating at a relatively slow speed, and deviates from said tight arc in a manner to cause a predetermined loosening of said belts when said fixed diameter pulley means on said base is rotating at a relatively rapid speed.

References Cited in the file of this patent

UNITED STATES PATENTS

| | | |
|---|---|---|
| 2,235,122 | Shaw | Mar. 18, 1941 |
| 2,689,484 | Phares | Sept. 21, 1954 |
| 2,881,624 | Cardona | Apr. 14, 1959 |
| 2,927,450 | Pool | Mar. 8, 1960 |
| 2,942,447 | Ricket et al. | June 28, 1960 |

FOREIGN PATENTS

| | | |
|---|---|---|
| 121,375 | Australia | May 24, 1944 |
| 437,710 | Great Britain | Nov. 4, 1935 |
| 931,439 | France | Feb. 23, 1948 |